United States Patent [19]

Gray

[11] 4,380,727
[45] Apr. 19, 1983

[54] VOLTAGE REGULATOR SYSTEM FOR MOTORCYCLES AND THE LIKE

[75] Inventor: Roger Gray, Cincinnati, Ohio

[73] Assignee: Thomas H. Rudd, Wayzata, Minn.

[21] Appl. No.: 247,515

[22] Filed: Mar. 25, 1981

[51] Int. Cl.³ .............................................. H02P 9/30
[52] U.S. Cl. .................................... 322/28; 310/68 R; 320/DIG. 2; 322/89
[58] Field of Search ............... 322/28, 89, 90; 320/64, 320/68, DIG. 2, 59; 310/68, 68 D

[56] References Cited

U.S. PATENT DOCUMENTS

| | | | |
|---|---|---|---|
| 2,848,679 | 8/1958 | Hochstetter | 310/68 D |
| 3,108,217 | 10/1963 | Robinson et al. | 322/73 X |
| 3,488,560 | 1/1970 | Konopa | 322/28 X |
| 3,496,394 | 2/1970 | Balcke et al. | 310/68 R |
| 3,663,946 | 5/1972 | Iwaki | 322/28 X |
| 3,668,514 | 6/1972 | Peck | 322/28 |
| 3,868,563 | 2/1975 | Hirata | 320/68 X |

Primary Examiner—R. J. Hickey
Attorney, Agent, or Firm—Frost & Jacobs

[57] ABSTRACT

A solid state voltage regulator for regulating the output voltage in the electrical system of a motor vehicle by controlling the current flow in a field winding associated with a DC generator. Current flow in the winding is permitted only when load current is being supplied by the regulator. The regulator is packaged in a housing which can be mounted directly to the field winding and ground terminals of the generator. The regulator is sepcifically designed for regulating the voltage associated with a motor cycle electrical system.

26 Claims, 5 Drawing Figures

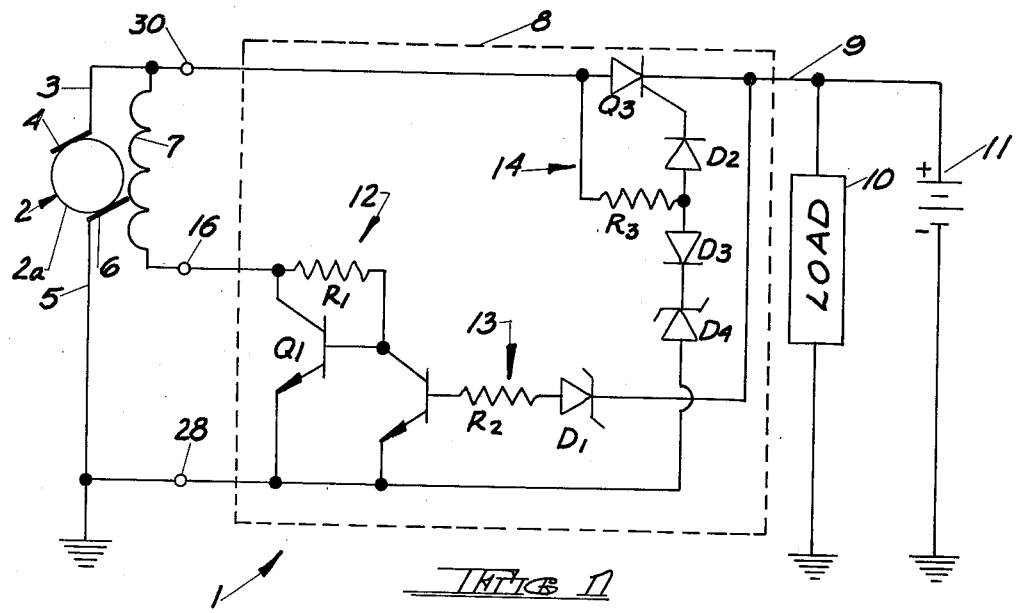
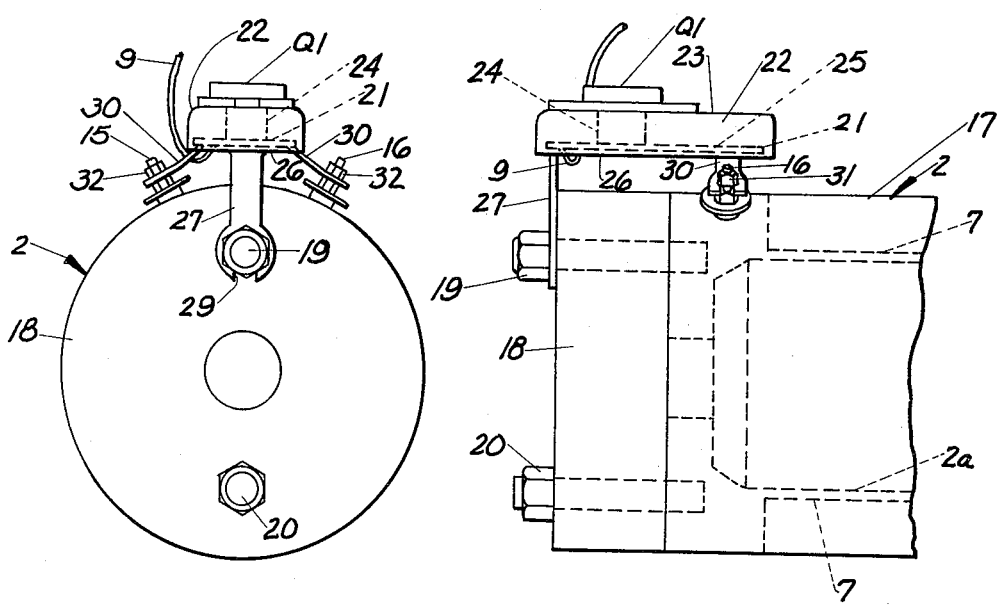

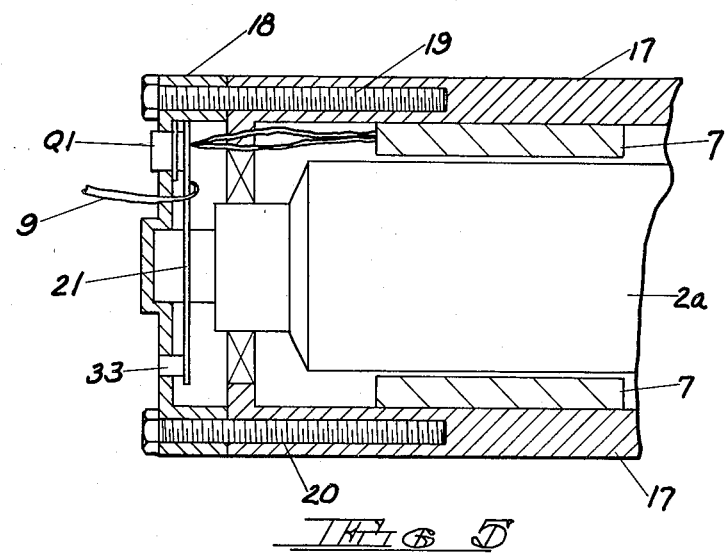
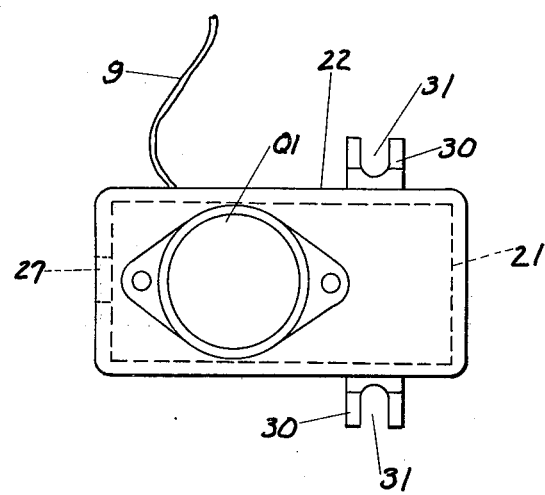

VOLTAGE REGULATOR SYSTEM FOR MOTORCYCLES AND THE LIKE

SUMMARY OF THE INVENTION

The present invention is directed generally to an electrical regulating system for maintaining a relatively constant output voltage from a generator driven by an internal combustion engine, and more particularly to such a regulating system for use with shunt field DC generators used with motorcycles.

Nearly every motor vehicle charging or voltage regulator system utilizes some type of device for insuring that the voltage output from the generator or alternator driven by the internal combustion engine remains at a relatively constant value in order to prevent damage to electrical components. The most common type of voltage regulator mechanism is electromechanical in nature and includes one or more relays which switch rapidly under conditions of varying load or input voltage. It is well known that such electromechanical voltage regulators are susceptible to rapid mechanical wear, particularly fusing of relay contacts which may result in generator or alternator overload. Recently, voltage regulators have been constructed which eliminate moving parts and rely on solid state components to sense voltage or load variations and provide correcting signals to maintain the output voltage at a constant level.

Both types of regulators have been used in motor vehicle charging and electrical supply systems which use a DC generator having a shunt field. With such generators, the voltage output is generally a function of the field current. In conventional generating systems, current flow through the field winding of the generator is maintained at all times, even when the system is running under or near no-load conditions. Consequently, the prime mover for the generator, which is usually an internal combustion engine, must supply a significant amount of energy to the generator merely to maintain the field winding in an energized condition, even though no additional energy demands are being made.

The present invention is directed to a voltage regulator system which energizes the field winding of the generator only when load current is required and only to the degree necessary to maintain a constant voltage output to the load. The regulator system is particularly applicable to automotive charging and electrical systems, and specifically to motorcycles. The fact that the field winding is energized only when required provides a significant energy savings and also reduces wear on the generator and prime mover, since the generator is essentially "free-wheeling" when no load current is required. In addition, the voltage regulator is fabricated in a small package which mounts directly to the motorcycle generator, thereby eliminating interconecting wiring and additional installation labor. Finally, the voltage regulator protects against short circuits in the case of an accidental fault to ground.

Further features of the invention will become apparent from the detailed description which follows.

BRIEF DESCRIPTION OF THE DRAWING

FIG. 1 is an electrical schematic diagram of the voltage regulator system of the present invention.

FIG. 2 is an end view of a generator mounting the voltage regulator package of the present invention.

FIG. 3 is a fragmentary side elevation view of the arrangement illustrated in FIG. 2.

FIG. 4 is a top plan view of the regulator package illustrated in FIG. 2 and FIG. 3.

FIG. 5 is a fragmentary cross sectional view of an alternate mounting scheme for the voltage regulator of the present invention.

DETAILED DESCRIPTION

The voltage regulator system of the present invention is illustrated generally at 1 in FIG. 1 and comprises a motor vehicle electrical charging system for producing a relatively low regulated DC voltage output. The system is particularly applicable to electrical charging and supply systems for motorcycles. The system includes generator means for producing a voltage comprising a DC generator 2 having a rotatably mounted armature 2a, a first non-movably mounted armature contact 3 connected to a first brush 4, a second non-movably mounted armature contact 5 connected to a second brush 6, and a stationary shunt field winding 7, one end of which is connected to armature contact 3.

The generator output voltage produced at armature contact 3 is maintained at a substantially constant value at the output of regulator system 1 by means of regulating means comprising a voltage regulator 8 to be described in more detail hereinafter. The output voltage from regulator 8 appearing on line 9 is supplied to a load 10, which may be of a variable nature, and a conventional storage battery 11. It will be understood, however, that either load and/or storage battery 11 may be eliminated in specific applications.

Regulator 8 is made up of three parts or sections, field winding control means 12 for regulating the flow of current through the field winding, sensing means 13 for causing increased current to flow through the field winding when the output voltage is less that a predetermined value and to cause decreased current to flow through the field winding when the output voltage is greater than the predetermined value, and output voltage control means 14 for permitting current flow to the voltage output from the generator means only when the value of output voltage is less than the predetermined value.

In the preferred embodiment illustrated in FIG. 1, field winding control means 12 comprises a first transistor Q1 having a collector terminal connected to the remaining terminal of field winding 7, an emitter terminal connected to armature contact 5 which forms system ground, and a base terminal connected to the collector of second transistor Q2. The emitter of transistor Q2 is connected to ground. Resistor means formed by fixed resistor R1 is connected between the collector and base terminals of transistor Q1.

Sensing means 13 is connected between field winding control means 12 and regulator voltage output line 9 and includes a resistor R2 connected to the base of transistor Q2, and a zener diode D1 having its anode connected to resistor R2 and its cathode connected to regulator voltage output line 9. In generaly, zener diode D1 will have a breakdown voltage less than the desired regulator output voltage.

Output voltage control means 14 is connected between armature contact 3 and voltage output line 9 and includes an SCR Q3 having its anode terminal connected to armature contact 3 and its cathode terminal connected to regulator voltage output line 9. Sensing means turn on SCR Q3 when the output voltage is less than a predetermined minimum, these sensing means including a diode D2 having its cathode connected to the gate electrode of SCR Q3, a diode D3 having its anode connected to the anode of diode D2, and a zener diode D4 having its cathode connected to the cathode of diode D3. The anode of zener diode D4 is connected to ground. Resistor means formed by a resistor R3 is connected between the anode of SCR Q3 and the anodes of diodes D2 and D3. In general, the breakdown voltage of zener diode D4 will be greater than the desired output voltage from regulator 8.

In operation, when the output voltage appearing on line 9 drops below a predetermined value, transistor Q2 is turned off, thereby permitting transistor Q1 to turn on and establish current flow through field winding 7, which in turn produces an output voltage from generator 2. At the same time, current flow is produced through resistor R3, diode D3 and zener diode D4 to establish sufficient gate-cathode potential to turn on SCR Q3, and supply charging or load current to 1 load 10 and storage battery 11. For example, for a nominal output voltage of 7.0 volts, as might be found in a motorcycle electrical supply system, zener diode D1 may have a threshold voltage of 6.2 volts and zener diode D4 may have a threshold voltage of 7.5 volts. Consequently, transistor Q2 will be turned off as long as the output voltage remains below approximately 6.2 volts. Likewise, SCR Q3 will be turned on whenever the output voltage from generator 2 exceeds approximately 8-0 volts (which includes the voltage drop across diode D3).

In the event that the output voltage on line 9 exceeds a predetermined value, transistor Q2 will be turned on, thereby turning off transistor Q1 which acts as a variable resistor to limit the current flow through field winding 7. This reduces the output voltage from generator 2, thus tending to also turn off SCR Q3 to inhibit current flow to load 10 and storage battery 11.

It will be understood from the above description that current flow through field winding 7 exists only when load current is required. Consequently, at or near no-lead conditions no current will flow through field windings 7, thereby conserving energy. In addition, it will be observed that in the event that output line 9 is inadvertently faulted to ground, which could produce a dangerous short circuit condition in conventional voltage regulators, the reduced voltage output from generator 2 will have the effect of turning off transistor Q1, thereby limiting the current flow through field winding 7 and restricting the current available from the generator. By the same token, in the event that the input line to regulator 8 formed by the connection to armature contact 3 is shorted to ground, the reduced generator voltage will also have the effect of turning transistor Q1 off to limit field winding current. Consequently, the voltage regulator of the present invention is substantially short circuit-proof.

In many applications it has been found desirable to mount the voltage regulator as close to the generator as possible. This becomes particularly critical where space is at a premium for example in connection with the electrical system of a motorcycle. The embodiment of the invention illustrated in FIG. 2–FIG. 4 describes packaging means for mounting the voltage regulator illustrated in FIG. 1 directly to the generator housing or casing. Here regulator 8 is used in connection with a generator 2 of the type having a rotatably mounted armature 2a, a pair of non-movably mounted field winding terminals 15 and 16 (see also FIG. 1), a stationary field winding 7, and a generally cylindrical generator housing 17 including a removable end cap 18 closing one end of housing 17. As best shown in FIG. 2, field winding terminals 15 and 16 extend radially outwardly from and are spaced circumferentially along the outer surface of housing 17 near the juncture with end cap 18. A pair of headed bolts 19 and 20, respectively, threadedly secure end cap 18 to generator housing 17 as is well known in the art. It will be observed that the head portion of one of the bolts, for example bolt 19, is positioned on the end cap 18 generally between field winding terminals 15 and 16.

The electronic circuitry forming generator 8 is mounted on an elongated generally rectangular thin printed circuit board 21 which is enclosed in a generally rectangular metallic regulator housing 22 which has a generally flat top portion 23 which serves as a heat sink to mount power transistor Q1. Internal connections between the transistor and circuit board 21 are illustrated generally at 24.

It will be observed that circuit board 21 is enclosed within regulator housing 22 in spaced parallel relationship with top portion 23. Furthermore, the interior of the housing may be filled with an electrically non-conducting potting material 25 which serves to define a bottom surface 26 of the regulator assembly.

An electrically conducting end lug 27 is connected to the ground terminal 28 of the circuitry shown in FIG. 1 and mounted on circuit board 21. End lug 27 extends perpendicularly outwardly away from bottom surface 26 adjacent one end of regulator housing 22. The lug terminates at its lowermost end in a longitudinally extending slot 29 configured to slip over the shank portion of bolt 19. This permits end lug 27 to be held in place between the head portion of bolt 19 and the end surface of end cap 18.

An electrically conducting side lug 30 extends angularly outwardly away from bottom surface 26 from each side of regulator housing 22. One of side lugs 30 is connected to the anode of SCR Q3, while the other of side lugs 30 is connected to the collector of power transistor Q1. Each of lugs 30 includes a longitudinally extending slot 31 which is configured to mate with a corresponding one of field winding terminals 15 and 16, respectively. Suitable threaded nuts 32 or the like may be used to secure side lugs 30 to field winding terminals 15 and 16.

A flexible conductor extends through the bottom surface 26 of the regulator and forms regulator output line 9. Conductor or line 9 may be secured to the load 10 and storage battery 11, which are not shown in FIG. 2–FIG. 4. As best shown in FIG. 2 and FIG. 3, the regulator is mountable on the generator so that the bottom surface of the regulator is spaced from the outer surface of the generator housing. This permits a compact installation and serves to minimize interconnecting wires between the regulator and the generator. Furthermore, cooling air may freely circulate around the regulator housing.

An alternate mounting arrangement for circuit board 21 bearing the electronic circuitry illustrated in FIG. 1 is shown in FIG. 5, where elements similar to those heretofore described have been similarly designated. In this embodiment, regulator housing 22 has been eliminated, and circuit board 21 mounted directly to the inside surface of end cap 18 by means of suitable stand-off mountings, one of which is shown at 33. Connection to field coils 7 may be made by suitable insulated conductors, one of which is shown at 34. In addition, clearance holes may be provided in end cap 18 for power transistor Q1 and regulator output lead 9. It will be observed that this method of construction permits the regulator to be constructed as an integral part of the generator, and avoids external mounting.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. In a motor vehicle electrical charging system for producing a relatively low regulated DC output voltage of the type having generator means for producing a generator output voltage comprising a DC generator having a pair of armature contacts and a field winding having one terminal connected to one of said contacts, and load means connected to said regulated output voltage comprising a storage battery and a variable load, the improvement in combination therewith comprising means for regulating said generator output voltage to a relatively constant value including field winding control means for regulating the flow of current through said field winding, sensing means connected between said control means and said regulated output voltage operating to cause increased current flow through said field winding when said regulated output voltage is less than a first predetermined value and to cause decreased current to flow through said field winding when said regulated output voltage is greater than a predetermined value, and output voltage control means comprising switch means connected between said first mentioned field winding terminal and said regulated output voltage and second sensing means for enabling said switch means for permitting current flow to said load from said generator means only when the value of regulated output voltage is less than a second predetermined value.

2. The system according to claim 1 wherein said field winding control means comprises a power transistor connected between the other terminal of said field winding and the other of said armature contacts, and means for controlling the current switched by said transistor.

3. The system according to claim 2 wherein said transistor includes a collector terminal connected to the other terminal of said field winding, an emitter terminal connected to the other of said armature contacts, and a base terminal, and said field winding control means further includes resistor means connected between said collector and base terminals, and said current controlling means comprises a second transistor having a collector terminal connected to said base terminal, an emitter terminal connected to said other armature contact, and a base terminal, said sensing means being connected to said second transistor base terminal.

4. The system according to claim 1 wherein said sensing means comprises zener diode means having a breakdown voltage less than the desired regulated output voltage connected between said field winding control means and said regulated voltage output.

5. The system according to claim 1 wherein said switch means comprises an SCR having an anode terminal and a cathode terminal connected, respectively, to said generator output voltage and said regulated output voltage, and a gate terminal.

6. The system according to claim 1 wherein said second sense means comprises a reference diode having a breakdown voltage greater than the desired regulated output voltage connected between said switch means and the other of said armature contacts.

7. The system according to claim 1 wherein said switch means comprises an SCR having an anode terminal and a cathode terminal connected, respectively, to said generator output voltage and said regulated output voltage, and a gate terminal; and said second sensing means comprises a reference diode having a breakdown voltage greater than the desired regulated output voltage connected between said SCR gate terminal and the other of said armature contacts, and resistor means connected between said generator means and said reference diode.

8. The system according to claim 1 wherein said field winding control means comprises a first transistor having a collector terminal connected to the other terminal of said field winding, an emitter terminal connected to the other of said armature contacts, and a base terminal; resistor means connected between said collector and base terminals; and a second transistor having a collector terminal connected to said base terminal, an emitter terminal connected to said other armature contact and a base terminal; said sensing means comprises a zener diode having a breakdown voltage less than the desired regulated output voltage connected between said second transistor base terminal and said regulated output voltage; and said output voltage control means comprises an SCR having an anode terminal and a cathode terminal connected, respectively, to said generator output voltage and said regulated output voltage, and a gate terminal; second sensing means for turning on said SCR when the regulated output voltage is less than a predetermined minimum, said second sensing means comprising a reference diode having a breakdown voltage greater than the desired regulated output voltage connected between said SCR gate terminal and the other of said armature contacts and resistor means connected between said generator means and said reference diode.

9. The system according to claim 8 wherein said generator includes a generator housing and a removable end cap closing one end of the housing, and said system further includes a thin printed circuit board bearing electronics comprising said regulating means and means for mounting said circuit board to said generator housing.

10. The system according to claim 9 wherein said mounting means mounts said circuit board to said end cap.

11. The system according to claim 10 wherein said generator further includes terminals connected to each end, respectively, of said field winding, said terminals extending radially outwardly from and spaced circumferentially along the outer surface of said housing, and a pair of headed bolts threadedly securing said end cap to said housing, the head portion of a first one of said bolts being positioned on said cap between said field winding terminals, a metallic regulator housing enclosing said circuit board, the interior of said housing being filled with an electrically non-conducting potting material to define a bottom surface to said regulating means, an electrically conducting end lug connected to form a ground terminal for said regulating means, said lug extending perpendicularly outwardly away from said bottom surface adjacent one end of said regulator housing and terminating in means configured to slip over said first bolt, an electrically conducting side lug extending angularly outwardly away from said bottom surface from each side of said regulator housing, each of said side lugs having means configured to mate with a corresponding one of said field winding terminals, said lugs being connected to the collector of said first transistor and the anode of said SCR, a reference diode having a breakdown voltage greater than the desired regulated output voltage connected between said SCR gate terminal and the other of said armature contacts, and resistor means connected between said generator means and said reference diode.

12. The system according to claim 1 wherein the magnitude of said first predetermined value is less than the magnitude of said second predetermined value.

13. In a motor vehicle charging system for producing a regulated DC voltage to a load of the type having generator means for producing a generator ouput voltage comprising a DC generator having a rotatably mounted armature, a stationary field winding, a non-movably mounted field winding contact to each end of said field winding, and a generally cylindrical generator housing enclosing said armature and winding including a removable end cap closing one end of the housing, said contacts extending radially outwardly from and being spaced circumferentially along the outer surface of said housing, and a pair of headed bolts threadedly securing said cap to said housing, the head portion of a first one of said bolts being positioned on said cap between said contacts, the improvement in combination therewith comprising means for regulating said generator output voltage to a relatively constant value including a thin printed circuit board bearing electronic circuitry for regulating the generator output voltage produced by said generator means to said constant value, said circuitry including an input terminal for connection to said generator output voltage, a ground terminal, and an output terminal for connection to said regulated voltage; a regulator housing enclosing said circuit board, the interior of said housing being filled with an electrically non-conducting potting material to define a bottom surface to said regulating means; and means for mounting said regulator housing to said generator housing.

14. The system according to claim 13 wherein said mounting means includes means for mounting said regulator housing to said field winding terminals.

15. The system according to claim 14 wherein said mounting means comprises an end lug extending outwardly away from said bottom surface adjacent one end of said regulator housing, said lug terminating in means configured to engage said first bolt, and a side lug extending angularly outwardly away from said bottom surface from each side of said housing, each of said side lugs including means configured to mate with a corresponding one of said field winding terminals, said regulator being mountable on said generator so that the bottom surface of the regulator is spaced from the outer surface of the generator housing.

16. The system according to claim 15 including a flexible conductor extending through the bottom surface of the regulator for connection to said regulated voltage.

17. The system according to claim 15 wherein said end lug is electrically conducting and connected to said ground terminal.

18. The system according to claim 15 wherein said mounting means comprises a longitudinally extending slot in said end lug configured to slip over said first bolt, said end lug being held against the end surface of the end cap by the headed portion of the first bolt.

19. The system according to claim 15 wherein said electronic circuitry includes means for controlling the amount of current flow in said field winding, said side lugs being electrically conducting and connected to said input terminal and said control means, respectively.

20. The system according to claim 15 wherein said mounting means comprises a longitudinally extending slot in each of said side lugs configured to mate with a corresponding one of said field winding terminals.

21. The system according to claim 15 wherein said regulator housing is metallic and includes a generally flat top surface serving as a heat sink, said circuit means including a power transistor for controlling current flow through said field winding, said power transistor being mounted to the outer surface of the top portion of the regulator housing, said circuit board being positioned within said regulator housing and spaced in generally parallel relationship with said top surface.

22. The system according to claim 13 wherein said mounting means comprises means for mounting said circuit board to the inside surface of said end cap.

23. A voltage regulator for use with a motor vehicle electrical charging system producing a relatively low regulated DC voltage output to a load of the type having a DC generator including a pair of armature contacts and a field winding having one terminal connected to one of the armature contacts, said regulator comprising:

field winding control means for regulating the flow of current through the field winding including a first power transistor having a collector terminal, means for connecting said collector terminal to the other terminal of the field winding, an emitter terminal, means for connecting the emitter terminal to the other of said armature contacts, and a base terminal; resistor means connected between said collector and base terminal; and a second transistor having a collector terminal connected to said base terminal, an emitter terminal, means for connecting said second transistor emitter terminal to said other armature contact, and a base terminal;

sensing means connected between said control means and said regulated voltage output, said sensing means operating to cause increased current to flow through said field winding when said regulated voltage output is less than a predetermined value and to cause decreased current to flow through said field winding when said regulated voltage output is greater than a predetermined value comprising a zener diode having a breakdown voltage less than the desired regulated voltage output connected between said second transistor base terminal and said regulated voltage output; and output voltage control means for connection between said first mentioned field winding terminal and said regulated voltage output for permitting current flow to said regulated voltage output from the generator means only when the value of regulated voltage ouput is less than a predetermined value including an SCR having an anode terminal and a cathode terminal, means for connecting said anode terminal to said first mentioned field winding terminal and means for connecting the cathode terminal to said regulated voltage output, and a gate terminal; second sensing means for turning on said SCR when the regulated voltage output is less than a predetermined minimum including a reference diode having a breakdown voltage greater than the desired regulated voltage output, means for connecting said reference diode between said SCR gate terminal and the other of said armature contacts, and resistor means connected between said SCR anode terminal and said reference diode.

24. A voltage regulator for producing a regulated DC voltage at a regulated voltage output terminal in a motor vehicle charging system of the type having generator means for producing a generator output voltage comprising a DC generator having a rotatably mounted armature, a stationary field winding, a non-movably mounted field winding contact connected to each end of said field winding, and a generally cylindrical generator housing enclosing said armature and winding including a removable end cap closing one end of the housing, said contacts extending radially outwardly from and being spaced circumferentially along the outer surface of said housing, and a pair of headed bolts threadedly securing said cap to said housing, the head portion of a first one of said bolts being positioned on said cap between said contacts, said regulator comprising means for regulating said generator output voltage to a relatively constant value including means for controlling the amount of current flow in said field winding, said regulating means being embodied in electronic circuitry, a thin printed circuit board bearing said electronic circuitry, said circuitry including an input terminal for connection to said generator output voltage, a ground terminal and an output terminal for connection to said regulated voltage output terminal, a regulator housing enclosing said circuit board, the interior of said housing being filled with an electrically non-conducting potting material to define a bottom surface to said regulating means, and means for mounting said regulator housing to said generator housing, said mounting means including means for mounting said regulator housing to said field winding terminals including an electrically conducting end lug extending outwardly away from said bottom surface adjacent one end of said regulator housing, said lug terminating in a longitudinally extending slot configured to slip over said first bolt such that the end lug may be held against the end surface of the end cap by the headed portion of the first bolt, an electrically conducting side lug extending angularly outwardly away from said bottom surface from each side of said housing, each of said side lugs terminating in a longitudinally extending slot configured to mate with a corresponding one of the field winding terminals, said regulator being mountable on said generator so that the bottom surface of the regulator is spaced from the outer surface of the generator housing, and a flexible conductor extending through the bottom surface of the regulator for connecting to said regulated voltage output terminal.

25. The regulator according to claim 24 wherein said end lug is electrically connected to said ground terminal, and said side lugs are electrically connected to said input terminal and said control means, respectively.

26. The regulator according to claim 25 wherein said regulator housing is metallic and includes a generally flat top surface serving as a heat sink, and said control means includes a power transistor for controlling current flow through the field winding, said power transistor being mounted to the outer surface of the top portion of the regulator housing, said circuit board being positioned within said regulator housing and spaced in generally parallel relationship with said top surface.

* * * * *